United States Patent

Xu

(10) Patent No.: US 9,188,017 B2
(45) Date of Patent: Nov. 17, 2015

(54) AIRFOIL ASSEMBLY WITH PAIRED ENDWALL CONTOURING

(71) Applicant: United Technologies Corporation, Hartford, CT (US)

(72) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 669 days.

(21) Appl. No.: 13/718,213

(22) Filed: Dec. 18, 2012

(65) Prior Publication Data

US 2014/0212260 A1 Jul. 31, 2014

(51) Int. Cl.
*F01D 9/04* (2006.01)
*F01D 5/14* (2006.01)

(52) U.S. Cl.
CPC .............. *F01D 9/041* (2013.01); *F01D 5/143* (2013.01); *Y02T 50/673* (2013.01)

(58) Field of Classification Search
CPC ......... F01D 5/143; F01D 5/145; F01D 5/225; F01D 9/041
See application file for complete search history.

(56) References Cited

U.S. PATENT DOCUMENTS

| | | | |
|---|---|---|---|
| 7,134,842 B2 * | 11/2006 | Tam et al. | 416/193 A |
| 7,220,100 B2 | 5/2007 | Lee et al. | |
| 8,105,037 B2 * | 1/2012 | Grover et al. | 416/193 A |
| 8,393,872 B2 * | 3/2013 | Kirtley | 416/243 |
| 8,439,643 B2 * | 5/2013 | Kuhne et al. | 416/193 A |
| 8,459,956 B2 * | 6/2013 | Pandey et al. | 416/243 |
| 8,647,066 B2 * | 2/2014 | Guimbard et al. | 416/193 A |
| 8,647,067 B2 * | 2/2014 | Pandey et al. | 416/223 R |
| 8,684,684 B2 * | 4/2014 | Clements et al. | 415/193 |
| 8,721,291 B2 * | 5/2014 | Lee et al. | 416/193 A |
| 2004/0081548 A1 * | 4/2004 | Zess et al. | 415/1 |
| 2008/0267772 A1 | 10/2008 | Harvey et al. | |
| 2012/0051894 A1 | 3/2012 | Clements et al. | |

FOREIGN PATENT DOCUMENTS

WO WO 2010/074930 A1 7/2010
WO WO 2011/022111 A2 2/2011

OTHER PUBLICATIONS

International Search Report and Written Opinion for related International Application No. PCT/US13/68736; report dated Jul. 29, 2014.

* cited by examiner

*Primary Examiner* — Igor Kershteyn
(74) *Attorney, Agent, or Firm* — Miller, Matthias & Hull LLP (57) ABSTRACT

An airfoil assembly is disclosed. The airfoil assembly may comprise a series of airfoils such as vanes radially extending between an ID endwall and a substantially concentric OD endwall. The airfoils are circumferentially spaced apart and define a plurality of fluid flow passages between adjacent airfoils. The ID endwall and the OD endwall define contoured regions to optimize fluid flow through the passages. A geometric relationship between the ID endwall contoured regions and the OD endwall contoured regions assures that the throat area generally increases or decreases in the direction of fluid flow.

21 Claims, 6 Drawing Sheets

AIRFOIL ASSEMBLY WITH PAIRED ENDWALL CONTOURING

FIELD OF THE DISCLOSURE

The present disclosure relates generally to airfoil assemblies utilized in gas turbine engines and, more particularly, to an airfoil assembly having paired endwall contouring.

BACKGROUND OF THE DISCLOSURE

Gas turbine engines typically include a compressor section, a combustion section and a turbine section, with an annular flow path extending axially through each. Initially, air flows through the compression section where it is compressed or pressurized. The combustors in the combustion section then mix and ignite the compressed air with fuel, generating hot combustion gases. These hot combustion gases are then directed by the combustors to the turbine section where power is extracted from the hot gases by causing turbine blades to rotate.

Some sections of the engine include airfoil assemblies comprising airfoils (typically blades or vanes) mounted at one or both ends to an endwall. Air within the engine moves through fluid flow passages in the airfoil assemblies. The fluid flow passages are defined by adjacent airfoils extending between concentric endwalls. Near the endwalls, the fluid flow is adversely impacted by a flow phenomenon known as a horseshoe vortex, which forms as a result of the boundary layer separating from the endwall as the gas passes the airfoils. The separated gas reorganizes into the horseshoe vortex. There is a high loss of efficiency associated with the vortex, and this loss is referred to as "secondary" or "endwall" loss. Accordingly, there exists a need for a way to mitigate or reduce these endwall losses.

SUMMARY OF THE DISCLOSURE

According to one embodiment of the present disclosure, an airfoil assembly having paired ID-OD endwall contouring is disclosed. The airfoil assembly comprises an inner diameter (ID) endwall having a surface, an outer diameter (OD) endwall having a surface, and a pair of airfoils. The ID endwall and the OD endwall are generally annular and concentric about a center line. The airfoils project radially outward from the ID endwall and terminate at the OD endwall. Each airfoil has a leading edge, a trailing edge and a first side and an opposite second side extending substantially axially between the leading edge and the trailing edge.

The airfoils are circumferentially spaced apart. The first side of each airfoil may be a pressure side and the second side of each airfoil may be a suction side. The ID endwall, the OD endwall and the airfoils define a fluid flow passage. Each fluid flow passage has a throat area that may vary in an axial direction. The surfaces of the ID endwall and the OD endwall define contoured regions.

In a refinement of the disclosure the ID endwall surface defines at least one of a convex profiled region and a concave profiled region.

In another refinement the OD endwall surface defines at least one of a convex profiled region and a concave profiled region.

In still another refinement the ID endwall surface defines at least one of a convex profiled region and a concave profiled region, and the OD endwall surface defines at least one of a convex profiled region and a concave profiled region.

The convex profiled region on the ID endwall may be adjacent to the first side of the airfoil and the concave profiled region on the ID endwall may be adjacent to the second side. Similarly, the convex profiled region on the OD endwall may be adjacent to the first side of the airfoil and the concave profiled region on the OD endwall may be adjacent to the second side.

The airfoil assembly may be part of a turbine vane assembly or a mid-turbine frame assembly and the throat area doesn't decrease and may increase in a direction of fluid flow.

Alternatively, the airfoil assembly may be part of a compressor vane assembly and the throat area doesn't increase and may decrease in in a direction of air flow.

The airfoils may be turbine vanes, compressor stator vanes, mid-turbine frame (MTF) vanes or fan exit guide vanes.

In another aspect of the disclosure a vane assembly is provided comprising a generally annular ID endwall, a generally annular OD endwall and a pair of vanes extending between the ID endwall and the OD endwall. The ID endwall has a radially outward facing surface, the radially outward facing surface defining first contoured regions. The OD endwall is substantially concentric with the ID endwall and has a radially inward facing surface, the radially inward facing surface defining second contoured regions.

Each vane is generally airfoil shaped and has a first side and an opposite second side extending axially between a leading edge and a trailing edge. The vanes are circumferentially spaced apart between the ID endwall and the OD endwall. The vanes and endwalls define an air flow passage.

There may be a geometric relationship between the first contoured regions and the second contoured regions.

In still another aspect of the disclosure a method of improving fluid dynamics within a gas turbine engine is provided. The method comprises the steps of: providing an airfoil assembly comprising a pair of airfoils extending between opposing endwalls, the airfoils and endwalls defining a fluid flow passage; moving fluid through a fluid flow passage; and influencing the general flow of the fluid through the fluid flow passage by providing contoured regions on both endwalls. Each contoured region may comprise a convex profiled region, a concave profiled region or both.

These and other aspects and features of the disclosure will become more readily apparent upon reading the following detailed description when taken in conjunction with the accompanying drawings.

DETAILED DESCRIPTION

While the present disclosure is susceptible to various modifications and alternative constructions, certain illustrative embodiments thereof will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

The present disclosure relates to an airfoil assembly for a gas turbine engine, the airfoil assembly comprising a plurality of airfoils extending between an outer diameter endwall and an inner diameter endwall, wherein the outer diameter endwall and the inner diameter endwall are contoured for optimal aerodynamics. More particularly, the outer diameter endwall and inner diameter endwall are contoured to minimize or eliminate the horseshoe vortexing phenomenon that can occur as airflow or combustion gases pass through the spaces (fluid flow passages) between the airfoils and the endwalls. The airfoils may be, without limitation, turbine vanes, compressor stators, mid-turbine frame (MTF) vanes and fan exit guide vanes.

Figure 1:
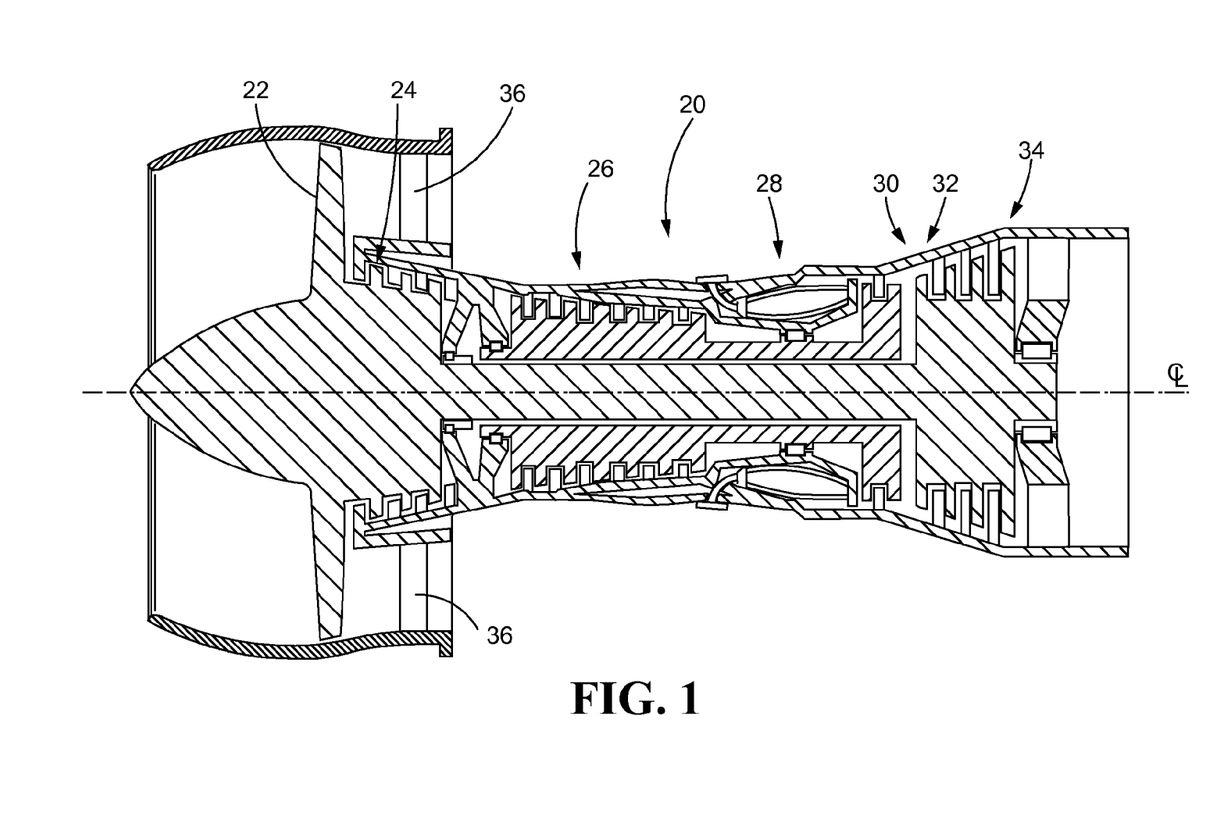
FIG. 1 is a schematic view of a gas turbine engine according to one embodiment of the present disclosure.

Referring now to the drawings and with specific reference to FIG. 1, in accordance with the teachings of the disclosure, an exemplary gas turbine engine 20 is shown. The gas turbine engine 20 may generally comprise a fan 22, a low-pressure compressor (LPC) section 24, a high-pressure compressor (HPC) section 26, a combustion section 28, a high-pressure turbine (HPT) section 30, a mid-turbine frame 32 and a low-pressure turbine (LPT) section 34 all arranged about a centerline CL.

Airflow passing through the fan 22 is split between a core engine flow path (which directs the air to the LPC and HPC sections) and a bypass duct. The air moving through the bypass duct passes through an array of circumferentially spaced apart fan exit guide vanes 36. The fan exit guide vanes 36 remove the swirl imparted by the fan 22 and redirect the air flow in a substantially axial flow path. The low-pressure compressor section 24 and the high-pressure compressor section 26 generally comprise rotors rotatable about the centerline CL, each rotor carrying a plurality of compressor blades, and stationary stator assemblies, each stator assembly carrying a plurality of compressor stators. The compressor stator vanes may be supported on their inner and outer ends by platforms having endwalls, or they may be cantilever mounted, as disclosed in co-owned U.S. Pat. Nos. 5,380,155 and 5,562,404 incorporated herein by reference.

Figure 2:
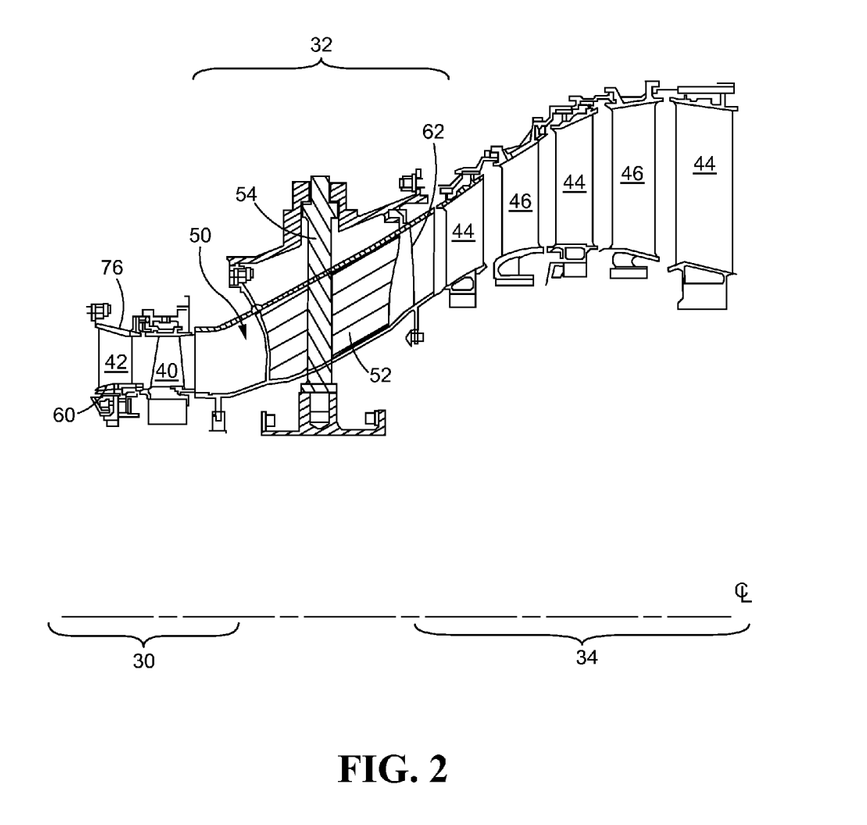
FIG. 2 is a cross-sectional view of a portion of the gas turbine engine of FIG. 1.

FIG. 2 is a cross-sectional view of a portion of the gas turbine engine 20 of FIG. 1, showing the HPT section 30, the mid-turbine frame 32 and the LPT section 34 in more detail. The HPT section 30 comprises a number of rotating blades 40 and a number of non-rotating vanes 42. Likewise, the LPT section 34 comprises a number of rotating blades 44 and a number of non-rotating vanes 46. The mid-turbine frame 32 includes a duct 50, a number of non-rotating MTF vanes 52 (only one MTF vane 52, shown in partial cross-section, is visible in FIG. 2), and a strut 54.

Still referring to FIG. 2, the turbine vanes 42, 46 are mounted on stationary platforms having a substantially annular inner diameter (ID) endwall and are supported at their outer ends by platforms having a substantially annular outer diameter (OD) endwall. The turbine blades 40, 44 are mounted on rotating disks and extract power from the hot combustion gases to operate the rotating compressor blades in the low-pressure compressor section 24 and in the high-pressure compressor section 26.

While the disclosure will now be described as being applied to a high-pressure turbine vane assembly, it should be understood that the disclosure is also applicable to, without limitation, low-pressure turbine vane assemblies, compressor stator assemblies, mid-turbine frame (MTF) vane assemblies and fan exit guide vane assemblies.

Figure 3:
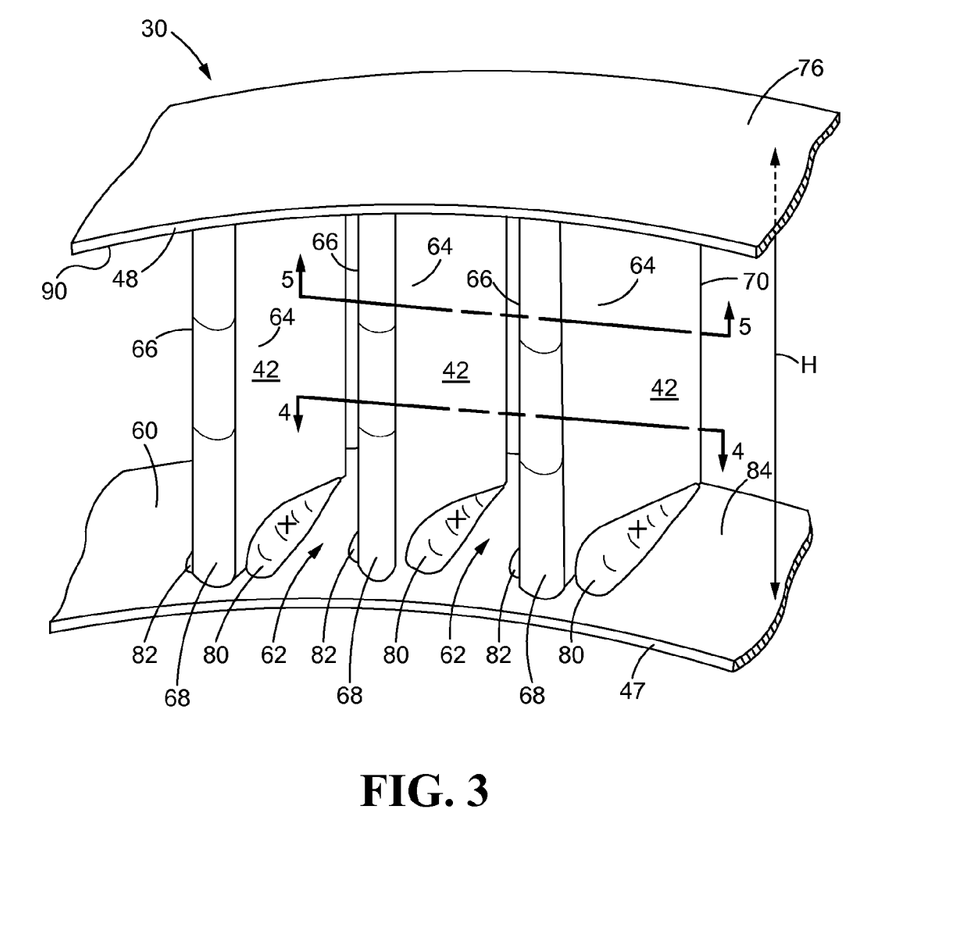
FIG. 3 is a perspective view of an airfoil array within the gas turbine engine of FIG. 1.

FIG. 3 is a perspective view of an airfoil assembly within a gas turbine engine 20 according to the disclosure. More particularly, FIG. 3 is a perspective view of an array of three high-pressure turbine vanes 42 mounted between endwalls 60, 76 within the high-pressure turbine section 30 of the gas turbine engine 20 of FIG. 1. As shown best in FIG. 3, the vanes 42 project radially outward from a substantially annular ID (inner diameter) endwall 60. The vanes 42 are circumferentially spaced apart on the ID endwall 60 and arranged about the engine centerline CL (FIG. 1), thereby defining a plurality of fluid flow passages 62 between adjacent vanes 42.

Each vane 42 may have a first side such as a pressure side 64 and an opposite side such as a suction side 66 extending between a leading edge 68 and a trailing edge 70. Fluid flow, such as airflow, moves through the fluid flow passages 62 from a location forward the leading edges 68 of the vanes 42 and toward the trailing edges 70 as the engine 20 typically operates.

The vanes 42 project radially outward from the ID endwall 60 and terminate at an OD (outer diameter) endwall 76. The ID endwall 60 and the OD endwall 76 are generally annular and concentric about the engine centerline CL. The vanes 42 are circumferentially spaced apart on both the ID endwall 60 and the OD endwall 76 with respect to the engine centerline CL.

The ID endwall 60 and the OD endwall 76 are both contoured for optimal aerodynamics. While it is known that airflow near the ID endwall 60 impacts airflow near the OD endwall 76 and vice versa, until now the ID endwall contours and OD endwall contours have not been optimized with respect to each other.

Still referring to FIG. 3, each fluid flow passage 62 has a height H, defined as the length of a radial line segment extending between the endwalls. This height H can vary, both in the axial direction (i.e., the direction of air flow) and in the transverse direction (i.e., the circumferential direction), because of the ID endwall contouring and OD endwall contouring.

Figure 4:
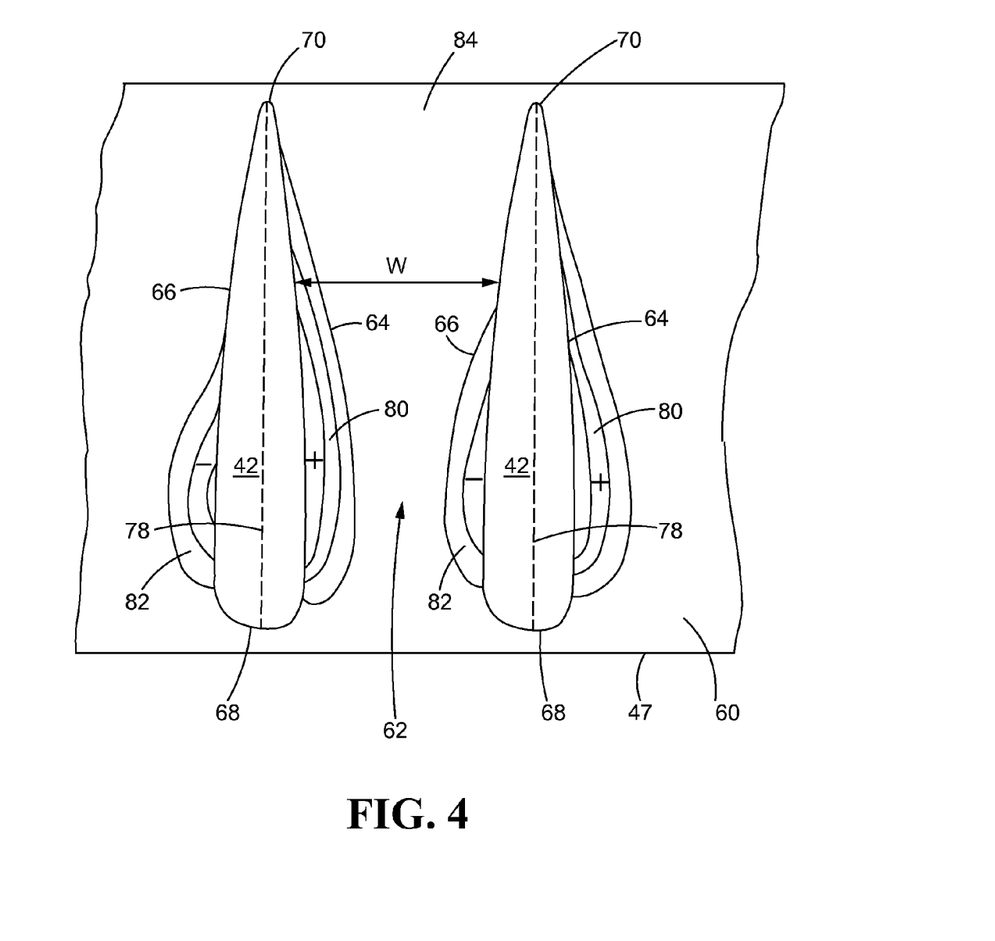
FIG. 4 is a cross-sectional view of the airfoil array of FIG. 3 taken along line 3-3.

FIG. 4 is a cross-sectional view of the high-pressure turbine vane array of FIG. 3 taken along line 4-4. Each vane 42 defines a chord 78 extending from the leading edge 68 to the trailing edge 70.

Each fluid flow passage 62 has a width W measured from the pressure side 64 of each vane 42 to the suction side 66 of a neighboring or adjacent vane 42. This width W typically will vary in the axial direction (i.e., in the direction of air flow) from the passage inlet (defined as the space between the leading edges 68 of adjacent vanes 42) to the passage outlet (defined as the space between the trailing edges 70 of adjacent vanes 42).

The cross-sectional area or "throat area" of each fluid flow passage 62 is defined as the area between adjacent vanes 42 and between the ID endwall 60 and the OD endwall 76 located in a plane perpendicular to the engine center line axis C. This throat area can vary in the axial direction (along the general path of the air flow) as explained further below.

For MTF vanes and turbine vanes, the throat area generally increases in the direction of air flow. Conversely, for compressor vanes, this throat area generally decreases in the direction of air flow.

In one aspect of the disclosure, the ID endwall 60 comprises a radially outward surface 84 facing the fluid flow passage 62 and defining at least one convex profiled region 80 and/or at least one concave profiled region 82 configured to help direct flow through each of the flow passages 62 while minimizing or eliminating horseshoe vortexing and endwall losses. The convex profiled region 80 may be located on the ID endwall 60 adjacent or near to the pressure side 64 of the vane 42. The concave profiled region 82 may be located on the ID endwall 60 adjacent or near to the suction side 30 of the vane 42. Relative to the surface 84 of the ID endwall 60, the convex profiled region 80 extends radially upward, or radially away from the engine centerline CL, and is indicated by positive signs (+), while the concave profiled region 82 extends radially downward, or radially toward the engine centerline CL, and is indicated by negative signs (−) in FIGS. 3-4.

Figure 5:
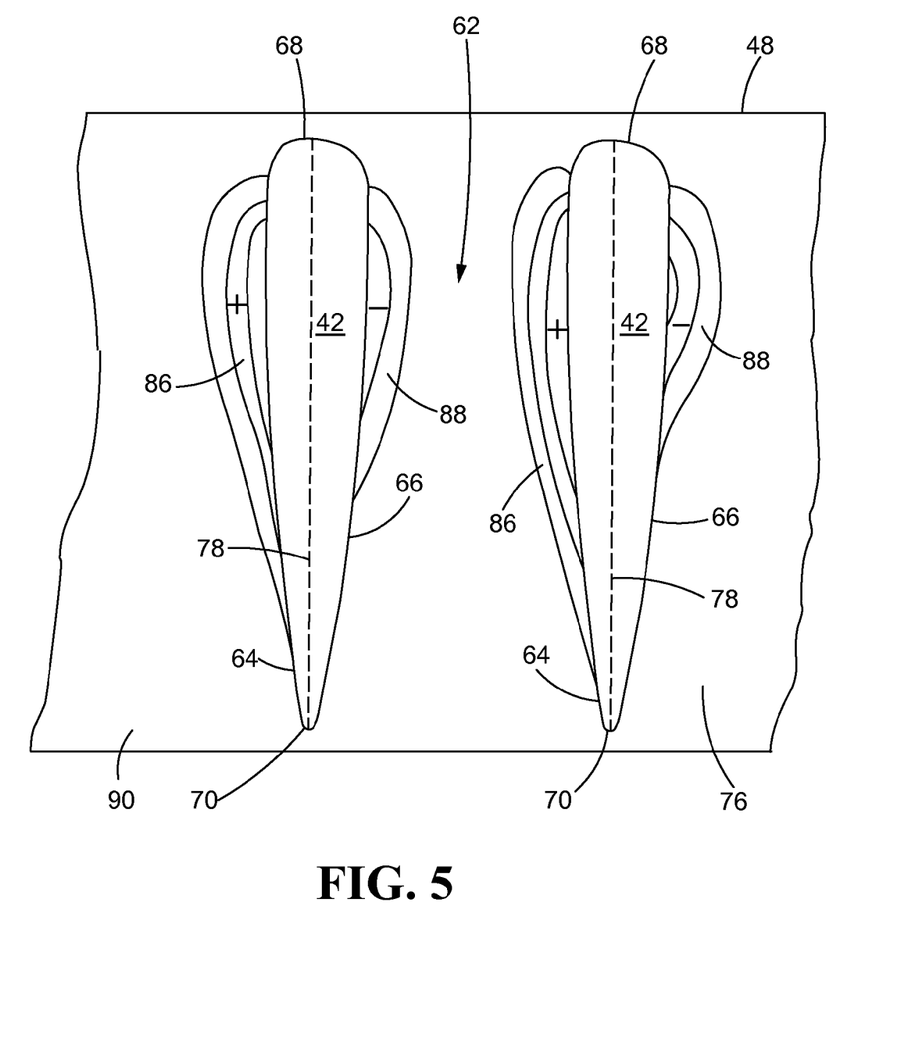
FIG. 5 is a cross-sectional view of the airfoil array of FIG. 3 taken along line 5-5.

Similarly, as shown in FIG. 5, the OD endwall 76 also comprises a radially inward surface 90 facing the fluid flow passage 62 and defining at least one convex profiled region 86 and/or at least one concave profiled region 88 configured to direct flow through each of the flow passages 62. As on the ID endwall 24, the at least one convex profiled region 86 may be located on the OD endwall 76 adjacent or near to the pressure side 64 of the vane 42. The at least one concave profiled region 88 may be located on the OD endwall 76 adjacent or near to the suction side 66 of the vane 42. Relative to the surface 90 of the OD endwall 76, the convex profiled region 86 extends radially downward, or radially toward the engine centerline CL, while the concave profiled region 88 extends radially upward, or radially away from the engine centerline CL.

With regard to both the ID endwall 60 and the OD endwall 76, the concave profiled regions 82, 88 and/or the convex profiled regions 80, 86 may merge into the airfoil shape of the vane 42. For example, with respect to the ID endwall 60 the at least one convex profiled region 80 may adjoin the pressure side 64 of the vane 42 and the at least one concave profiled region 82 may adjoin the suction side 66. A portion of the concave profiled regions 82, 88 and/or the convex profiled regions 80, 86 of the ID endwall and OD endwall contouring may be upstream of the leading edge 68 of the vane 42. A portion of the concave profiled regions 82, 88 and/or the convex profiled regions 80, 86 of the ID endwall and OD endwall contouring may be downstream of the trailing edge 70 of the vane 42. Each concave profiled region 82, 88 may define a maximum concavity and each convex profiled region 80, 86 may define a maximum convexity. The maximum convexity may be upstream of, axially downstream of, or aligned with the maximum concavity. Regardless of the contouring of the ID endwall 60 and the OD endwall 76, the endwalls 60, 76 must provide a fluidly smooth transition from the non-contoured ID and OD endwalls at either end of the immediately upstream blades. Generally this is accomplished in part by locating the contouring downstream of the upstream edge 47 of the ID endwall 60 and downstream of the upstream edge 48 of the OD endwall 76.

Although between each pair of vanes 42 a single convex profiled region 80 and a single concave profiled region 82 are shown on the ID endwall surface 84 and a single convex profiled region 86 and a single concave profiled region 88 are shown on the OD endwall surface 90 in FIG. 3-5, it is understood that each of the flow passages 62 may have other contouring configurations, including without limitation two or more convex profiled regions and/or two or more concave profiled regions on either the OD endwall or the ID endwall.

There may be a geometric relationship between the contoured regions on the ID endwall 60 and the contoured regions on the OD endwall 76. For example, the contoured regions may be configured (shaped and located) on the ID endwall 60 and the OD endwall 76 so that the throat area doesn't decrease and may generally increase in the direction of air flow. A similar geometric relationship may exist with respect to the contoured regions on the ID endwall and OD endwall at either end of the MTF vanes, where the throat area doesn't decrease and may generally increase in the direction of air flow. Conversely, for compressor vanes the throat area generally doesn't increase and may decrease in the direction of air flow, and so the contoured regions of the ID endwall and the contoured regions of the OD endwall at either end of the compressor vanes may be configured accordingly.

Figure 6:
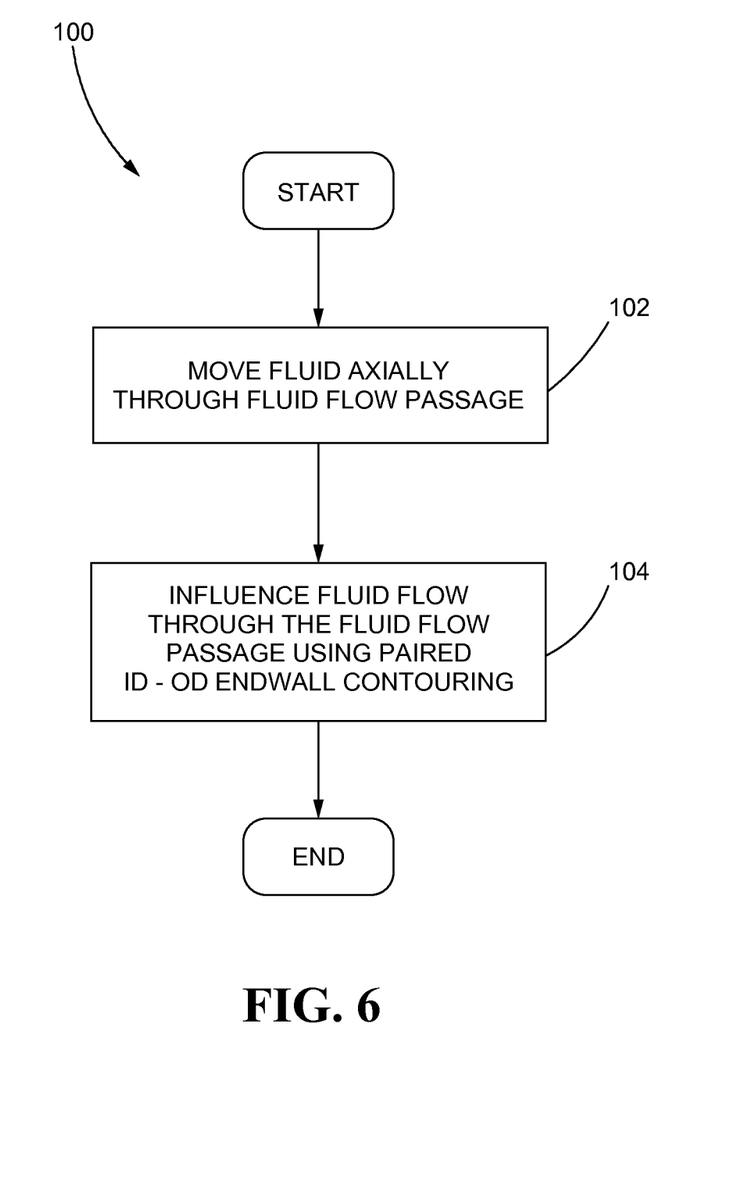
FIG. 6 is a flowchart outlining a method of improving fluid dynamics within a gas turbine engine, according to another embodiment of the present disclosure.

Referring now to FIG. 6, an exemplary flowchart outlining a method 100 of improving fluid dynamics within a gas turbine engine 20 is shown, according to another embodiment of the present disclosure. At a first step 102, a fluid is moved axially toward the fluid flow passage 62 established between (defined by) adjacent vanes 42 and opposing endwalls 60, 76 in the gas turbine engine 20. The vanes 42 project radially from the ID endwall 60, each vane 42 having a first side 64 and an opposite, second side 66 extending axially between a leading edge 68 and a trailing edge 70. The second step 104 comprises influencing fluid flow through the fluid flow passage 62 by using the contoured regions, i.e., the convex profiled regions 80, 86 and/or the concave profiled regions 82, 88 of the ID endwall 60 and the OD endwall 76 respectively.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

In particular, the disclosure is applicable to vane assemblies such turbine vane assemblies and compressor stator vane assemblies comprising airfoils extending between opposing endwalls. The disclosure has particular applicability with regard to a mid-turbine frame assembly (MTF) generally located between a high pressure turbine and a low pressure turbine. The disclosure may also have applicability with regard to a compressor stator assembly. The disclosure may also have applicability with regard to a fan exit guide vane assembly.

The disclosure described provides a way to mitigate or reduce endwall losses in an airfoil assembly. By providing paired ID and OD endwall contouring, the present disclosure influences fluid flow through the flow passages defined by the airfoil assemblies, thereby reducing endwall losses due to horseshoe vortexing. Furthermore, the paired endwall contouring described herein results in an improved aerodynamic performance of turbine vane assemblies and other airfoil assemblies.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. An airfoil assembly comprising:
   an ID endwall having a surface;
   an OD endwall having a surface, the ID endwall and the OD endwall being concentric about a center line; and
   a pair of airfoils projecting radially outward from the ID endwall and terminating at the OD endwall, each airfoil having a leading edge, a trailing edge and a first side and an opposite second side extending substantially axially between the leading edge and the trailing edge, the airfoils being circumferentially spaced apart;

wherein the ID endwall, the OD endwall and the airfoils define a fluid flow passage; and wherein the surfaces of the ID endwall and the OD endwall define at least one of a contoured region, the contoured region having more than two profiled regions.

2. The airfoil assembly of claim 1 wherein:
the ID endwall surface defines at least one of a convex profiled region and a concave profiled region.

3. The airfoil assembly of claim 1 wherein:
the OD endwall surface defines at least one of a convex profiled region and a concave profiled region.

4. The airfoil assembly of claim 1 wherein:
the ID endwall surface defines at least one of a convex profiled region and a concave profiled region; and
the OD endwall surface defines at least one of a convex profiled region and a concave profiled region.

5. The airfoil assembly of claim 1 wherein:
the ID endwall surface defines a convex profiled region and a concave profiled region; and
the OD endwall surface defines a convex profiled region and a concave profiled region.

6. The airfoil assembly of claim 5 wherein:
the convex profiled region on the ID endwall is adjacent to the first side and the concave profiled region on the ID endwall is adjacent to the second side; and
the convex profiled region on the OD endwall is adjacent to the first side and the concave profiled region on the OD endwall is adjacent to the second side.

7. The airfoil assembly of claim 6 wherein:
the first side of each airfoil is a pressure side; and
the second side of each airfoil is a suction side.

8. The airfoil assembly of claim 1 wherein:
each fluid flow passage defines a throat area; and
the throat area varies in an axial direction.

9. The airfoil assembly of claim 8 wherein:
the airfoil assembly is part of a turbine vane assembly or a mid-turbine frame assembly;
fluid may flow through the fluid flow passage in a direction of fluid flow defined generally as the direction from the leading edges to the trailing edges; and
the throat area does not decrease in the direction of fluid flow.

10. The airfoil assembly of claim 8 wherein:
the airfoil assembly is part of a compressor vane assembly;
fluid may flow through the fluid flow passage in a direction of fluid flow defined generally as the direction from the leading edges to the trailing edges; and
the throat area does not increase in the direction of fluid flow.

11. The airfoil assembly of claim 1 wherein the airfoils are turbine vanes.

12. The airfoil assembly of claim 1 wherein the airfoils are compressor stator vanes.

13. The airfoil assembly of claim 1 wherein the airfoils are MTF vanes.

14. The airfoil assembly of claim 1 wherein the airfoils are fan exit guide vanes.

15. A vane assembly comprising:
an ID endwall having a radially outward facing surface, the radially outward facing surface defining a first contoured region;
an OD endwall substantially concentric with the ID endwall and having a radially inward facing surface, the radially inward facing surface defining a second contoured region;
a pair of vanes extending between the ID endwall and the OD endwall, each vane being generally airfoil shaped and having a first side and an opposite second side extending axially between a leading edge and a trailing edge, the vanes being circumferentially spaced apart between the ID endwall and the OD endwall, the vanes and endwalls defining an air flow passage; and
the first contoured region on the ID endwall having more than two profiled regions; and
the second contoured region of the OD endwall having more than two profiled regions.

16. The vane assembly of claim 15 wherein:
there is a geometric relationship between the first contoured region and the second contoured region.

17. The vane assembly of claim 15 wherein:
the ID endwall has an upstream edge;
the OD endwall has an upstream edge;
the contoured region defined by the ID endwall is located downstream of the upstream edge of the ID endwall; and
the contoured region defined by the OD endwall is located downstream of the upstream edge of the OD endwall.

18. A method of improving fluid dynamics within a gas turbine engine, the method comprising the steps of:
providing an airfoil assembly comprising a pair of airfoils extending between opposing endwalls, the airfoils and endwalls defining a fluid flow passage;
moving fluid through a fluid flow passage;
influencing the general flow of the fluid through the fluid flow passage by providing at least one of a contoured region on both endwalls; and
the contoured region on both endwalls defining more than two profiled regions.

19. The method of claim 18 wherein:
at least one of the contoured regions comprises a convex profiled region.

20. The method of claim 18 wherein:
at least one of the contoured regions comprises a concave profiled region.

21. The method of claim 18 wherein:
each contoured region comprises a convex profiled region and a concave profiled region.

* * * * *